(12) United States Patent
Wu et al.

(10) Patent No.: US 11,640,903 B2
(45) Date of Patent: May 2, 2023

(54) ANALYSIS APPARATUS AND ANALYSIS METHOD

(71) Applicant: Kioxia Corporation, Tokyo (JP)

(72) Inventors: Jiahong Wu, Mie (JP); Miki Takimoto, Mie (JP)

(73) Assignee: KIOXIA CORPORATION, Tokyo (JP)

( * ) Notice: Subject to any disclaimer, the term of this patent is extended or adjusted under 35 U.S.C. 154(b) by 84 days.

(21) Appl. No.: 17/404,769

(22) Filed: Aug. 17, 2021

(65) Prior Publication Data
US 2022/0277946 A1 Sep. 1, 2022

(30) Foreign Application Priority Data

Feb. 26, 2021 (JP) .............................. JP2021-030586

(51) Int. Cl.
*H01J 49/04* (2006.01)
*H01J 49/16* (2006.01)
*H01J 49/10* (2006.01)

(52) U.S. Cl.
CPC ...... *H01J 49/0409* (2013.01); *H01J 49/0418* (2013.01); *H01J 49/105* (2013.01); *H01J 49/161* (2013.01)

(58) Field of Classification Search
CPC .. H01J 49/0409; H01J 49/0418; H01J 49/105; H01J 49/161; H01J 49/164
See application file for complete search history.

(56) References Cited

U.S. PATENT DOCUMENTS

| | | | |
|---|---|---|---|
| 10,222,337 B1 * | 3/2019 | Yoo ....................... | H01J 49/105 |
| 2006/0019279 A1 | 1/2006 | Bosse et al. | |
| 2006/0057554 A1 | 3/2006 | Watling et al. | |
| 2008/0261321 A1 | 10/2008 | Patton et al. | |
| 2011/0305872 A1 | 12/2011 | Li et al. | |
| 2013/0263296 A1 | 10/2013 | Pomper et al. | |
| 2014/0079686 A1 | 3/2014 | Barman et al. | |
| 2014/0213807 A1 | 7/2014 | Ichikawa et al. | |
| 2014/0294963 A1 | 10/2014 | Dorfman et al. | |
| 2014/0377808 A1 | 12/2014 | Liu | |

(Continued)

FOREIGN PATENT DOCUMENTS

| | | |
|---|---|---|
| JP | H09-133617 A | 5/1997 |
| JP | H11-051904 A | 2/1999 |

(Continued)

*Primary Examiner* — David E Smith
(74) *Attorney, Agent, or Firm* — Foley & Lardner LLP

(57) ABSTRACT

An analysis apparatus includes a stage on which an analysis sample as an analysis target and a first adjustment sample used for adjusting a focus are provided. A laser generation unit generates a laser beam for vaporizing the analysis sample or the first adjustment sample by irradiating the sample with the laser beam. A detection unit detects a signal intensity of an element of the analysis sample or the first adjustment sample vaporized by irradiation with the laser beam. A controller determines a focus position of the laser beam with respect to a front surface position of the first adjustment sample based on the signal intensity of the first adjustment sample, and performs a control such that the focus position of the laser beam corresponds with a front surface of the analysis sample.

15 Claims, 12 Drawing Sheets

(56) References Cited

U.S. PATENT DOCUMENTS

| | | | |
|---|---|---|---|
| 2015/0138545 A1* | 5/2015 | Day | G01J 3/0272 356/318 |
| 2016/0056031 A1 | 2/2016 | Loboda | |
| 2017/0031033 A1 | 2/2017 | Makarov et al. | |
| 2018/0143197 A1 | 5/2018 | Gabor Miklos | |
| 2019/0328748 A1 | 10/2019 | Price et al. | |
| 2020/0049599 A1 | 2/2020 | Alexander et al. | |
| 2020/0051802 A1 | 2/2020 | Summerfield et al. | |
| 2020/0203139 A1 | 6/2020 | Schwieters | |

FOREIGN PATENT DOCUMENTS

| | | |
|---|---|---|
| JP | H11-201944 A | 7/1999 |
| JP | H11-201945 A | 7/1999 |
| JP | 2002-118103 A | 4/2002 |
| JP | 2004-325390 A | 11/2004 |
| JP | 2004-347473 A | 12/2004 |
| JP | 2005-523448 | 8/2005 |
| JP | 2008-506929 | 3/2008 |
| JP | 2008-506971 | 3/2008 |
| JP | 2008-268221 | 11/2008 |
| JP | 2011-137740 A | 7/2011 |
| JP | 2013-528114 | 7/2013 |
| JP | 2014-500275 | 1/2014 |
| JP | 2014-024710 A | 2/2014 |
| JP | 2014-504149 | 2/2014 |
| JP | 2014-518847 | 8/2014 |
| JP | 2015-016466 | 1/2015 |
| JP | 2016-514195 | 5/2016 |
| JP | 2016-522887 | 8/2016 |
| JP | 2017-026620 A | 2/2017 |
| JP | 2017-081962 | 5/2017 |
| JP | 2017-117719 A | 6/2017 |
| JP | 2017-203713 A | 11/2017 |
| JP | 2018-529975 | 10/2018 |
| JP | 2019-503474 | 2/2019 |
| JP | 2019-070199 | 5/2019 |
| JP | 2019-131558 | 8/2019 |
| JP | 2019-210291 | 12/2019 |
| JP | 2019-220484 | 12/2019 |
| JP | 2020-504140 | 2/2020 |
| JP | 2020-518117 | 6/2020 |
| JP | 2020-102453 | 7/2020 |
| WO | WO-2019/202689 | 10/2019 |
| WO | WO-2019/202690 | 10/2019 |
| WO | WO-2020055810 A1 * | 3/2020 ............... G01N 1/04 |
| WO | WO-2020234657 A1 * | 11/2020 ........... G01N 21/718 |

* cited by examiner

FIRST IRRADIATION (L1)

SECOND IRRADIATION (L2)

ANALYSIS APPARATUS AND ANALYSIS METHOD

CROSS-REFERENCE TO RELATED APPLICATION

This application is based upon and claims the benefit of priority from Japanese Patent Application No. 2021-030586, filed Feb. 26, 2021, the entire contents of which are incorporated herein by reference.

FIELD

Embodiments described herein relate generally to an analysis apparatus and an analysis method.

BACKGROUND

A laser ablation-inductively coupled plasma-mass spectrometer (LA-ICP-MS) apparatus vaporizes a sample by irradiating the sample with a laser beam using a laser ablation device, introduces the vaporized sample into an ICP-MS device, and performs quantitative analysis of a metal element contained in the sample.

On the other hand, a three-dimensional memory cell array in which memory cells are three-dimensionally arranged has a stacked structure in which a plurality of different materials are stacked. In such a stacked structure, a memory hole having a high aspect ratio is formed. In order to improve performance of the memory, it is necessary to form metal elements in a stacked structure or to remove residual metal elements via the memory hole. At this time, it is important to control a concentration of the metal elements contained in the stacked structure. For this reason, the LA-ICP-MS apparatus may be used for quantitative analysis of the metal elements.

In order to perform quantitative analysis on a stacked structure in a depth direction with a high precision, it is important to control ablation in the depth direction. Since a depth of ablation strongly depends on a focus position of the laser, it is important to adjust a focus of the laser before or during ablation. However, since work of adjusting the focus of the laser is manually performed by an operator, there is a variation in the focus adjustment for each measurement. For this reason, it is difficult to correctly recognize a shape of the stacked structure in the depth direction. As a result, it is difficult to obtain an accurate profile of the metal element contained in the stacked structure.

DETAILED DESCRIPTION

Figure 1:
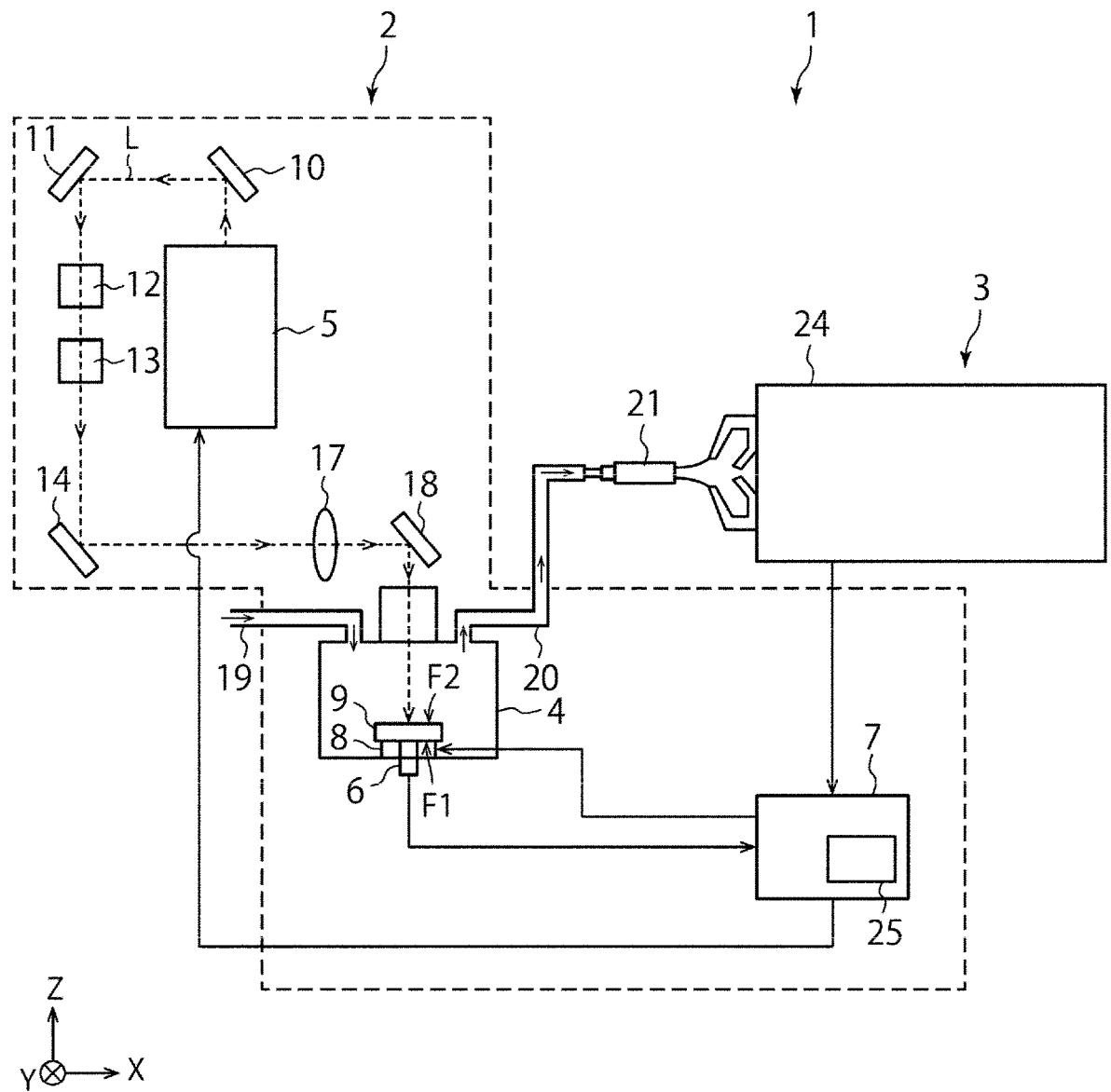
FIG. 1 is a diagram illustrating a configuration example of an LA-ICP-MS apparatus according to at least one embodiment.

At least one embodiment provides an analysis apparatus and an analysis method capable of suppressing a variation in laser focus adjustment and performing automatic focus adjustment.

In general, according to at least one embodiment, an analysis apparatus includes a stage on which an analysis sample as an analysis target and a first adjustment sample used for adjusting a focus are provided. A laser generation unit (laser generator) generates a laser beam for vaporizing the analysis sample or the first adjustment sample by irradiating the sample with the laser beam. A detection unit (detector) detects a signal intensity of an element of the analysis sample or the first adjustment sample vaporized by irradiation with the laser beam. A controller determines a focus position of the laser beam with respect to a front surface position of the first adjustment sample based on the signal intensity of the first adjustment sample, and performs a control such that the focus position of the laser beam corresponds with a front surface of the analysis sample.

Hereinafter, embodiments according to the present disclosure will be described with reference to the drawings. The present embodiment does not limit the present disclosure. The drawings are schematically or conceptually illustrated, and a ratio of each portion is not necessarily the same as the actual one. In the specification and the drawings, the same reference numerals are given to the same portions as those described with reference to the foregoing drawings, and a detailed description thereof will be omitted as appropriate.

Figure 2:
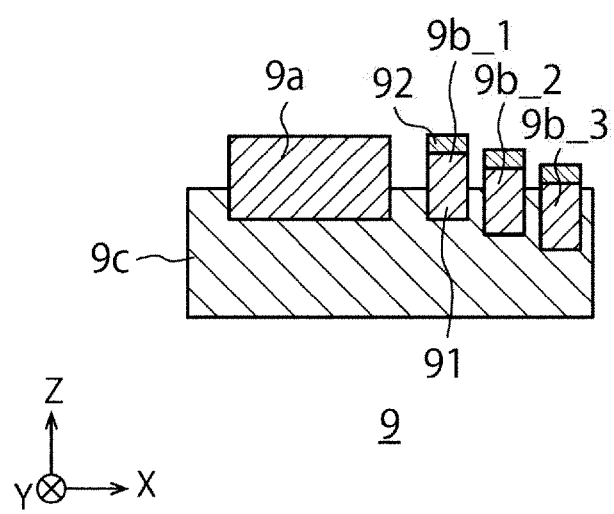
FIG. 2 is a sectional view illustrating a configuration example of a sample unit.

FIG. 1 is a diagram illustrating a configuration example of an LA-ICP-MS apparatus according to the present embodiment. FIG. 2 is a sectional view illustrating a configuration example of a sample unit 9.

The LA-ICP-MS apparatus 1 as an analysis apparatus includes a laser ablation (LA) unit 2 and an inductively coupled plasma-mass spectrometer (ICP-MS) unit 3. The LA unit 2 performs laser ablation by irradiating a sample unit 9 with a laser beam L. The ICP-MS unit 3 performs quantitative analysis of elements contained in a sample by ionizing the sample vaporized by the LA unit 2 using plasma. In FIG. 1, the laser beam L is indicated by a broken line arrow, and a flow of data or a control signal is indicated by a solid line arrow.

The LA unit 2 includes a sample chamber 4, a laser generation unit 5, a film thickness measurement device 6, a controller 7, mirrors 10, 11, 14, and 18, wavelength conversion elements 12 and 13, and a lens 17. A stage 8 on which the sample unit 9 for analysis is placed is provided in the sample chamber 4.

As illustrated in FIG. 2, the sample unit 9 includes an analysis sample 9a, adjustment samples 9b_1 to 9b_3, and a support member 9c. The analysis sample 9a is a sample as a mass spectrometric analysis target, and contains, for example, silicon as a main element. The adjustment samples 9b_1 to 9b_3 are samples to be used for adjusting a focus position of the laser beam L. The adjustment samples 9b_1 to 9b_3 are made of the same material as the main element of the analysis sample 9a, and are made of, for example, a silicon single crystal. For example, the adjustment samples 9b_1 to 9b_3 include a main body (for example, a silicon single crystal) 91 formed in a predetermined size, and a metal thin film (for example, nickel) 92 for coating a front surface of the main body 91. The metal thin film is so thin as to be negligible as compared with the silicon single crystal used for adjusting the focus position Hf, and is used for detecting an abnormal condition of the ICP-MS apparatus 1, such as a plasma temperature. As the metal thin film, for example, a metal material having a low ionization potential such as nickel (Ni), sodium (Na), iron (Fe), or tungsten (W) may be used.

The adjustment samples 9b_1 to 9b_3 have substantially the same size, and are provided on the support member 9c such that front surface positions (positions in a Z direction) are different from each other. The support member 9c is made of a material (for example, a metal material) capable of allowing a depth machining accuracy in a plane region of several to several tens of square centimeters to be equal to or lower than 0.1 μm. The support member 9c includes recess portions for providing and fixing the analysis sample 9a and the adjustment samples 9b_1 to 9b_3. For example, the analysis sample 9a and the adjustment sample 9b_1 are provided in the recess portions of the support member 9c, and thus heights of upper surfaces of the analysis sample 9a and the adjustment sample 9b_1 are substantially the same. The adjustment sample 9b_2 is provided in the recess portion of the support member 9c, and thus a height of an upper surface of the adjustment sample 9b_2 is lower than the height of the upper surface of the adjustment sample 9b_1 by a predetermined depth (thickness). The adjustment sample 9b_3 is provided in the recess portion of the support member 9c, and thus a height of an upper surface of the adjustment sample 9b_3 is lower than the height of the upper surface of the adjustment sample 9b_2 by a predetermined depth (thickness). The predetermined depth (thickness) is set so as to be substantially equal to a depth (thickness) of the analysis sample 9a that is ablated in a case where the analysis sample 9a is irradiated with the laser beam L by a predetermined number of times. The support member 9c is placed and fixed on the stage 8. The number of the adjustment samples 9b_1 to 9b_3 provided on the sample unit 9 is not limited to three, and may be two or less or four or more. A focus adjustment method of the laser beam L using the analysis sample 9a and the adjustment samples 9b_1 to 9b_3 will be described later.

The laser generation unit 5 as a laser generation unit generates a laser beam for vaporizing the sample 9a or the like by irradiating any one of the analysis sample 9a or the adjustment samples 9b_1 to 9b_3 (hereinafter, also referred to as the sample 9a or the like). The laser generation unit 5 may include, for example, as a light source, an Nd-YAG laser that generates a laser beam having a wavelength of 1064 nm. In the LA unit 2, the laser beam having a predetermined wavelength (for example, a wavelength of 1064 nm) generated from the laser generation unit 5 is reflected by the mirrors 10 and 11, and enters the wavelength conversion element 12.

The wavelength conversion element 12 converts the wavelength of the laser beam into a wavelength of 532 nm (a second harmonic wave). Thereafter, the wavelength conversion element 13 converts the wavelength of the laser beam from 532 nm to 266 nm (a third harmonic wave). By setting the wavelength of the laser beam to a short wavelength, the energy of the laser beam can be increased, and thus ablation can be performed on more materials.

As described above, the wavelength of the laser beam is halved by the wavelength conversion element 12, and is further halved by the wavelength conversion element 13. Thereafter, the sample 9a or the like in the sample chamber 4 is irradiated with the laser beam via the mirror 14, the lens 17, and the mirror 18. By irradiating the sample 9a or the like with the laser beam, the sample 9a or the like is ablated (that is, vaporized).

An introduction pipe 19 and a discharge pipe 20 are connected to the sample chamber 4 by piping. The introduction pipe 19 introduces a carrier gas such as an argon gas into the sample chamber 4. One end of the discharge pipe 20 is connected to the sample chamber 4, and the other end of the discharge pipe 20 is connected to the ICP-MS unit 3. The discharge pipe 20 discharges the sample 9a or the like vaporized by the laser beam from the sample chamber 4 together with the carrier gas, and transports the sample 9*a* or the like to the ICP-MS unit 3. That is, the sample 9*a* or the like vaporized by the laser beam irradiation is transported to the ICP-MS unit 3 via the discharge pipe 20 together with the carrier gas introduced into the sample chamber 4 by the introduction pipe 19.

The ICP-MS unit 3 as a detection unit and a calculation unit includes a plasma torch 21 and a mass analysis unit 24, and performs quantitative analysis of the gas from the sample chamber 4 in order to specify a content of a material (element) as an analysis target that is contained in the sample 9*a* or the like. The plasma torch 21 ionizes the sample 9*a* or the like introduced together with the carrier gas from the discharge pipe 20, using plasma. The mass analysis unit 24 extracts only ions of the material such as the sample 9*a* or the like from the ionized gas, and detects a signal intensity (spectrum) of the element such as the vaporized sample 9*a* or the like. The mass analysis unit 24 detects ions of the material such as the sample 9*a* or the like, and performs quantitative analysis based on a detection result of the ions. Further, the mass analysis unit 24 includes a calculation unit 25 that performs calculation based on result data obtained by the quantitative analysis. As the calculation unit 25, for example, a computer, for example may be used. Further, in at least one embodiment, the ICP-MS unit 3 is used. On the other hand, an ICP-optical emission spectrometer (ICP-OES) unit may be used instead of the ICP-MS unit 3. In this case, the ICP-OES unit specifies a content of a target element based on an optical wavelength (spectrum) obtained from the vaporized sample 9*a* or the like. The target element is, for example, an element such as silicon or metal.

The film thickness measurement device 6 measures a thickness of the sample 9*a* or the like at an irradiation position of the laser beam L. The film thickness measurement device 6 is embedded in the stage 8, and is provided toward a surface of the sample 9*a* or the like facing the stage 8. That is, the film thickness measurement device 6 measures the film thickness of the sample 9*a* or the like from a rear surface of the sample 9*a* or the like. The film thickness measurement device 6 may be, for example, any one of an ultrasonic measurement device, a spectral interference measurement device, and an electromagnetic induction measurement device. The film thickness measurement device 6 is not particularly limited as long as the film thickness measurement device 6 can measure the film thickness of the sample 9*a* or the like in a nondestructive manner. In at least one embodiment, the film thickness measurement device 6 measures the film thickness of the sample 9*a* or the like from the rear surface of the sample 9*a* or the like. On the other hand, as in a modification example to be described, the film thickness measurement device 6 may measure the film thickness of the sample 9*a* or the like from a front surface of the sample 9*a* or the like as long as the film thickness measurement device 6 does not interfere with the laser beam L.

The controller 7 controls an irradiation condition of the laser beam L from the laser generation unit 5 based on a measured value of the thickness of the sample 9*a* or the like from the film thickness measurement device 6 or a result of the quantitative analysis. The irradiation condition includes, for example, an intensity of the laser beam L, an irradiation time of the laser beam L, the number of times of irradiation (the number of pulses), an irradiation area of the laser beam L, a focus position of the laser beam L, or the like. For example, in a case where a vaporization rate (hereinafter, also referred to as an ablation rate) of the sample 9*a* or the like by the laser beam L is substantially constant, the controller 7 controls the irradiation condition of the laser beam L such that a change in the thickness of the sample 9*a* or the like is substantially constant. For example, in a case where the ablation rate is too low, the controller 7 increases the intensity of the laser beam L, the irradiation time of the laser beam L, the number of times of irradiation (the number of pulses), and the irradiation area of the laser beam L. In a case where the ablation rate is too high, the controller 7 decreases the intensity of the laser beam L, the irradiation time of the laser beam L, the number of times of irradiation (the number of pulses), and the irradiation area of the laser beam L.

On the other hand, the ablation rate also depends on the focus position (height: a position in the Z direction) of the laser beam L with respect to a position (height: a position in the Z direction) of a to-be-vaporized front surface of the sample unit 9. In a case where the focus position of the laser beam L substantially matches with the front surface position of the sample 9*a* or the like, the ablation rate is high and stable. On the other hand, in a case where the focus position of the laser beam L is largely deviated from the front surface position of the sample 9*a* or the like, the ablation rate is low and unstable. Therefore, in order to stabilize the ablation rate, the controller 7 adjusts the focus position of the laser beam L with respect to the front surface of the sample unit 9 based on a depth of the ablated sample 9*a* or the like each time ablation is performed by a predetermined number of times. In order to control the focus position of the laser beam L with respect to the front surface of the sample 9*a* or the like, the controller 7 may control the focus position (height) of the laser beam L in the Z direction by controlling the laser generation unit 5, or may control a position (height) of the stage 8 in the Z direction. The Z direction is a direction in which the sample 9*a* or the like is irradiated with the laser beam L.

For example, the controller 7 may be configured with a personal computer, or may be configured with a semiconductor chip such as a CPU. The controller 7 may be included in the LA unit 2, or may be provided separately from the LA unit 2. Further, the controller 7 may be provided in the ICP-MS unit 3.

Figure 3A:
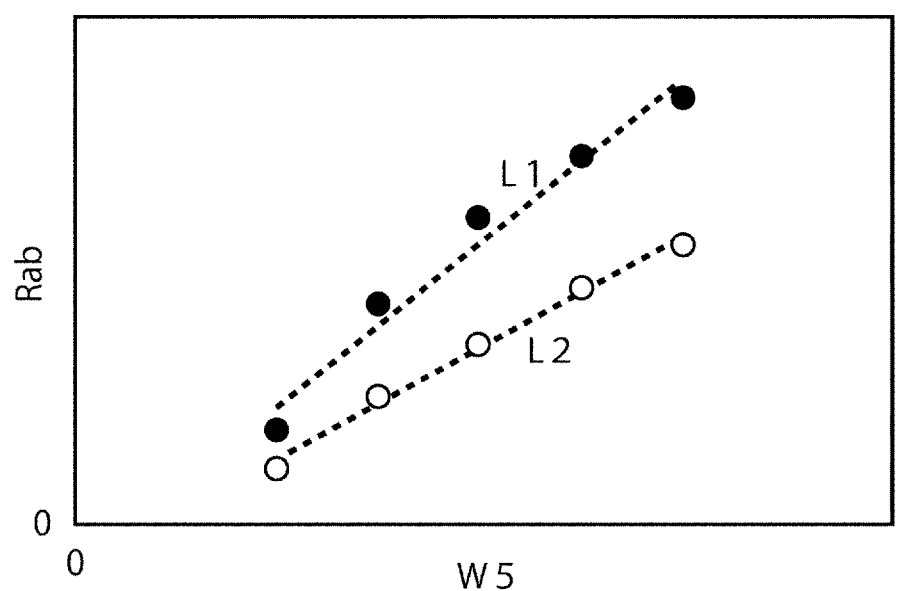
FIG. 3A is a graph illustrating a relationship between an output of a laser generation unit and an ablation rate.

In a case where an operator manually adjusts a focus F for irradiating the sample 9*a* or the like with the laser beam L, a position of the focus F of the laser beam L may vary according to a skill of the operator. Further, in a process of analysis, in a case where the front surface of the sample 9*a* is scraped by ablation, the position of the focus F of the laser beam L may deviate from the front surface of the sample 9*a*. For example, FIG. 3A is a graph illustrating a relationship between an output W5 of the laser generation unit 5 and the ablation rate Rab. A vertical axis represents the ablation rate Rab, and a horizontal axis represents the output W5 of the laser generation unit 5. The ablation rate Rab is a depth (thickness) of a material (for example, a silicon single crystal) that is ablated in a case where irradiation with the laser beam L is performed by a predetermined number of times. Further, lines L1 and L2 respectively correspond to first irradiation and second irradiation by the laser beam L. The LA-ICP-MS apparatus 1 and other conditions are the same.

Figure 3B:
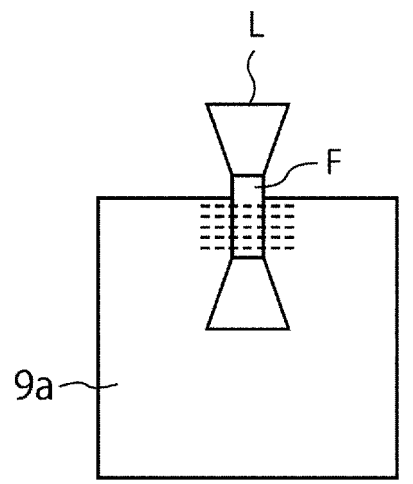
FIG. 3B is a conceptual diagram illustrating a state of first irradiation.
Figure 3C:
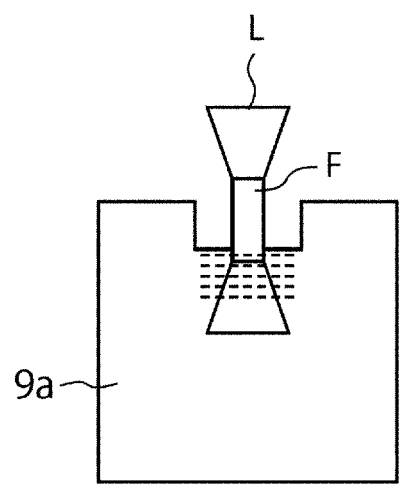
FIG. 3C is a conceptual diagram illustrating a state of second irradiation.

As illustrated in the lines L1 and L2, the ablation rates Rab are different from each other with respect to the same output W5. A difference in the ablation rates Rab of the lines L1 and L2 is caused by a slight deviation between the front surface position of the sample 9*a* in the first irradiation and the front surface position of the sample 9*a* in the second irradiation. For example, FIG. 3B is a conceptual diagram illustrating a state of the first irradiation. FIG. 3C is a conceptual diagram illustrating a state of the second irradiation. As illustrated in FIG. 3B, in a case where the front surface of the sample 9a is irradiated with the laser beam L by a plurality of number of times in the first irradiation, the front surface of the sample 9a is scraped by the irradiation. As a result, as illustrated in FIG. 3C, in the second irradiation, a relative position between the front surface of the sample 9a and the focus F of the laser beam L differs from that in the first irradiation. As a result, the ablation rate Rab is different from that in the first irradiation.

Figure 4:
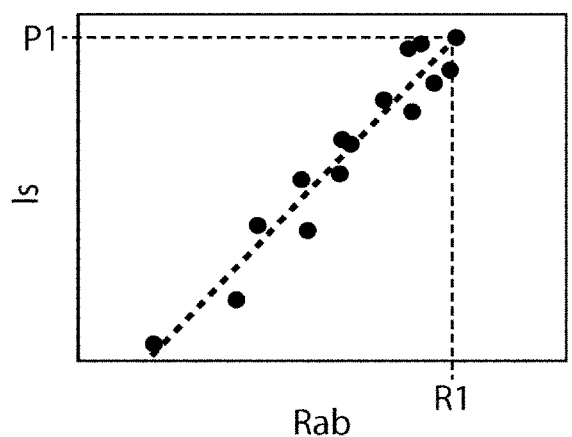
FIG. 4 is a graph illustrating a relationship between an ablation rate and a signal intensity obtained by ICP-MS measurement.

FIG. 4 is a graph illustrating a relationship between the ablation rate Rab and a signal intensity Is obtained by ICP-MS measurement. A vertical axis represents, for example, a signal intensity Is of silicon that is detected by ICP-MS measurement. A horizontal axis represents the ablation rate Rab of silicon. From this graph, the ablation rate Rab and the signal intensity Is are in a correlation relationship, and are substantially proportional. That is, it can be seen that the ablation rate Rab can be determined using the signal intensity Is.

Figure 5:
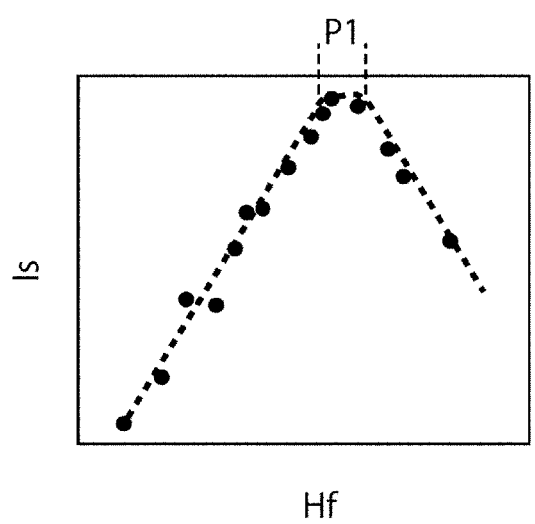
FIG. 5 is a graph illustrating a relationship between the signal intensity obtained by ICP-MS measurement and a focus position of a laser beam.

FIG. 5 is a graph illustrating a relationship between the signal intensity Is obtained by ICP-MS measurement and the focus position Hf of the laser beam L. A vertical axis represents, for example, a signal intensity Is of silicon that is detected by ICP-MS measurement. A horizontal axis represents a relative position Hf of the focus of the laser beam L with respect to the front surface position of silicon such as the sample 9a. Hereinafter, the relative position of the focus of the laser beam L with respect to the front surface position of the sample 9a or the like is also simply referred to as a focus position Hf. The signal intensity Is (that is, the ablation rate Rab) changes depending on the focus position Hf, and includes a peak region P1 in a certain range of the focus position Hf. The peak region P1 of the signal intensity Is indicates a state where the focus position Hf substantially matches (corresponds) with the front surface position of the sample 9a or the like. The peak region P1 indicates a certain region of the signal intensity Is including a maximum value (peak point) of the signal intensity Is. Here, that the focus position Hf of the laser beam L corresponds with the front surface position of the sample 9a or the like means not only that the focus position Hf of the laser beam L and the front surface position of the sample 9a or the like completely match with each other but also that the front surface position of the sample 9a or the like is included in a certain range of the focus position Hf.

In a region outside the peak region P1 of the signal intensity Is, the signal intensity Is changes with a relatively large slope. That is, a change in the signal intensity Is due to a variation in the focus position Hf is relatively large. On the other hand, the slope of the signal intensity Is changes before and after the peak region P1, and the signal intensity Is is stable in the peak region P1 as compared with the other regions. Thus, in the peak region P1, a change in the signal intensity Is due to a variation in the focus position Hf is relatively small. Therefore, by adjusting the focus position Hf such that the signal intensity Is is within the peak region P1, a change in the signal intensity Is due to a variation in the focus position Hf can be suppressed to be relatively small.

By using the relationship between the signal intensity Is and the focus position Hf, the ICP-MS apparatus 1 according to at least one embodiment makes the focus position Hf correspond with the analysis sample 9a as follows and performs laser ablation.

Figure 6:
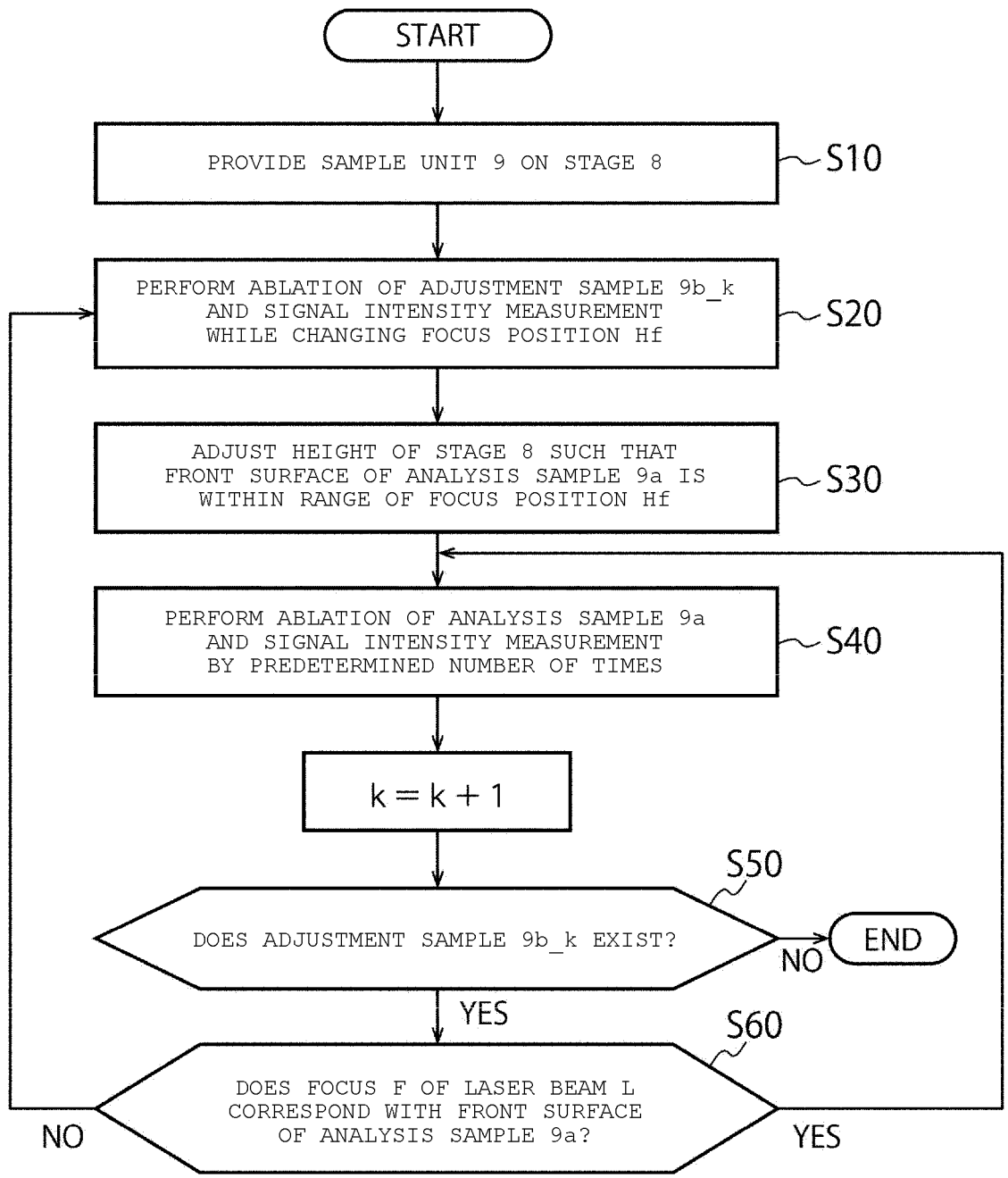
FIG. 6 is a flowchart illustrating laser ablation according to at least one embodiment.

FIG. 6 is a flowchart illustrating laser ablation according to at least one embodiment. Hereinafter, assuming that a main element of the sample 9a or the like is silicon and a metal thin film of the adjustment sample 9b_1 is nickel, a description will be given.

First, the sample unit 9 including the analysis sample 9a and the adjustment samples 9b_1 to 9b_3 is provided on the stage 8 (S10).

Next, ablation of the adjustment sample 9b_1 (k=1) and signal intensity measurement are performed while changing the focus position Hf of the laser beam L (S20). FIGS. 7A to 7F are conceptual diagrams illustrating a method of adjusting the focus position Hf of the laser beam L using the adjustment sample 9b_1. As illustrated in FIGS. 7A to 7F, ablation of the adjustment sample 9b_1 is performed while changing the relative position between the focus F of the laser beam L and the front surface of the adjustment sample 9b_1 in the Z direction.

Figure 7A:
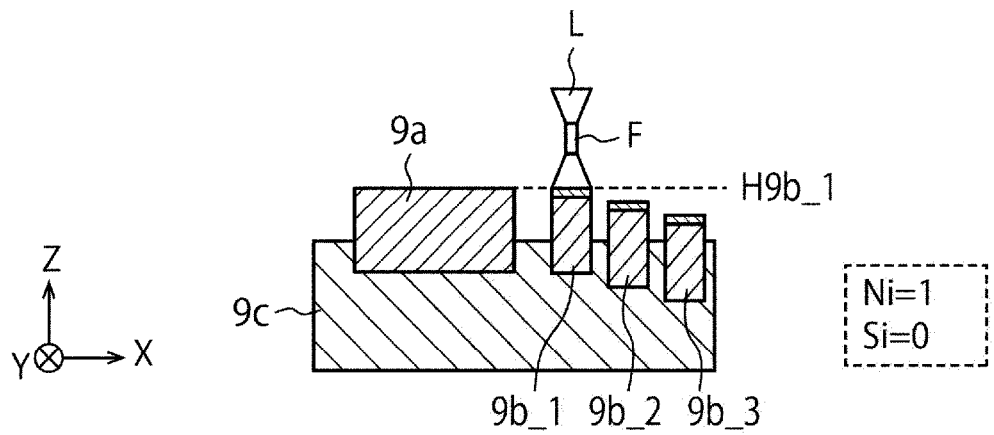
FIG. 7A is a conceptual diagram illustrating a method of adjusting the focus position of the laser beam using an adjustment sample.

For example, at the position of the focus F illustrated in FIG. 7A, the controller 7 performs a control such that the front surface of the adjustment sample 9b_1 is irradiated with the laser beam L. At the same time, the ICP-MS unit 3 measures a signal intensity of an element which is ablated from the adjustment sample 9b_1. The metal thin film (for example, nickel) of the adjustment sample 9b_1 is very thin, as described above. Thus, in a case where the apparatus 1 is in a normal condition, even though the position of the focus F is deviated from the front surface position of the adjustment sample 9b_1 to some extent, the adjustment sample 9b_1 is ablated in a short time. On the other hand, the sample material (for example, silicon) under the metal thin film affects the signal intensity (ablation rate) in a case where the focus F is deviated from the front surface position of the adjustment sample 9b_1. As illustrated in FIG. 7A, in a case where the focus F is greatly deviated from the front surface position H9b_1 of the adjustment sample 9b_1, the signal intensity of silicon of the adjustment sample 9b_1 is very low. Ratios of the signal intensities of nickel and silicon to the maximum value of the peak region P1 of the signal intensity Is of FIG. 5 (hereinafter, also referred to as signal intensity ratios) are approximately 1 and approximately 0, respectively. That is, in this case, the ablation rate of nickel is substantially equal to the maximum value, while the ablation rate of silicon is substantially 0.

Figure 7B:
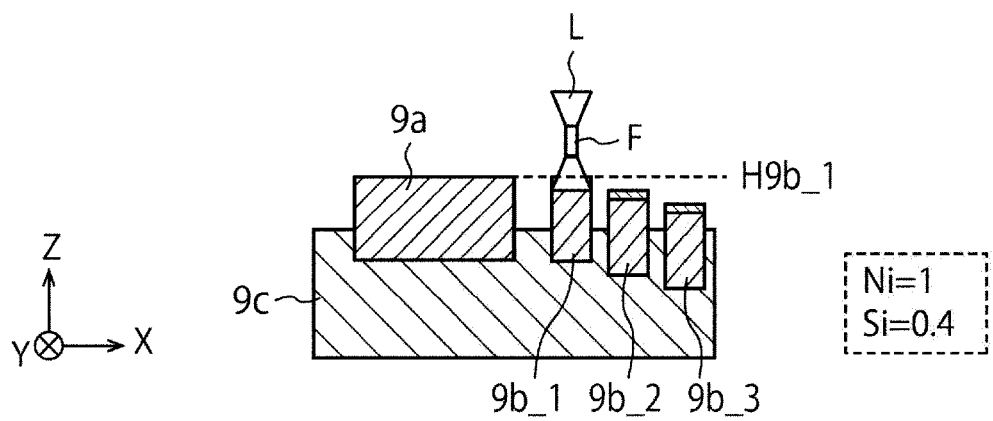
FIG. 7B is a conceptual diagram illustrating a method of adjusting the focus position of the laser beam using an adjustment sample.

Next, the relative position of the focus of the laser beam L with respect to the front surface position H9b_1 of the adjustment sample 9b_1 is changed by changing the height of the stage 8 (position in the Z direction). At the position of the focus F illustrated in FIG. 7B, the controller 7 performs a control such that the front surface of the adjustment sample 9b_1 is irradiated with the laser beam L. At this time, the controller 7 performs a control such that a front surface region of the adjustment sample 9b_1, which is not yet irradiated with the laser beam L, is irradiated with the laser beam L by shifting the laser beam L from the irradiation position of FIG. 7A in an X direction or a Y direction. Thereby, the apparatus 1 performs again ablation of nickel and silicon of the adjustment sample 9b_1 under the same conditions as in FIG. 7A while changing the relative position of the focus F. As illustrated in FIG. 7B, the focus F approaches the front surface position H9b_1 of the adjustment sample 9b_1, but is still deviated. In this case, the signal intensity of silicon of the adjustment sample 9b_1 increases to some extent, but is still low. The signal intensity ratios of nickel and silicon are approximately 1 and approximately 0.4, respectively.

Figure 7C:
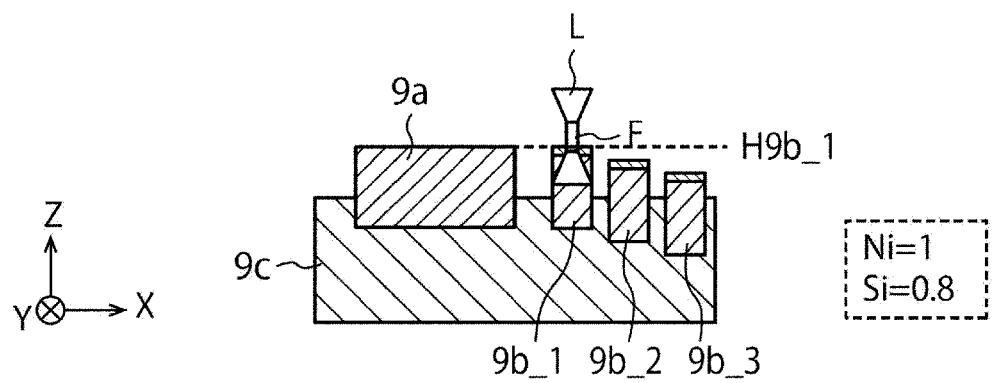
FIG. 7C is a conceptual diagram illustrating a method of adjusting the focus position of the laser beam using an adjustment sample.

Next, the relative position of the focus of the laser beam L with respect to the front surface position H9b_1 of the adjustment sample 9b_1 is further changed by changing the height of the stage 8 (position in the Z direction). At the position of the focus F illustrated in FIG. 7C, the controller 7 performs a control such that the front surface of the adjustment sample 9b_1 is irradiated with the laser beam L. At this time, the controller 7 performs a control such that a front surface region of the adjustment sample 9b_1, which is not yet irradiated with the laser beam L, is irradiated with the laser beam L by shifting the laser beam L from the irradiation positions of FIGS. 7A and 7B in an X direction or a Y direction. Thereby, the apparatus 1 performs again ablation of nickel and silicon of the adjustment sample 9b_1 under the same conditions as in FIGS. 7A and 7B while changing the relative position of the focus F. As illustrated in FIG. 7C, in a case where the front surface position H9b_1 of the adjustment sample 9b_1 is within a range of the focus F, the signal intensity of silicon of the adjustment sample 9b_1 increases. The signal intensity ratios of nickel and silicon are approximately 1 and approximately 0.8, respectively.

Figure 7D:
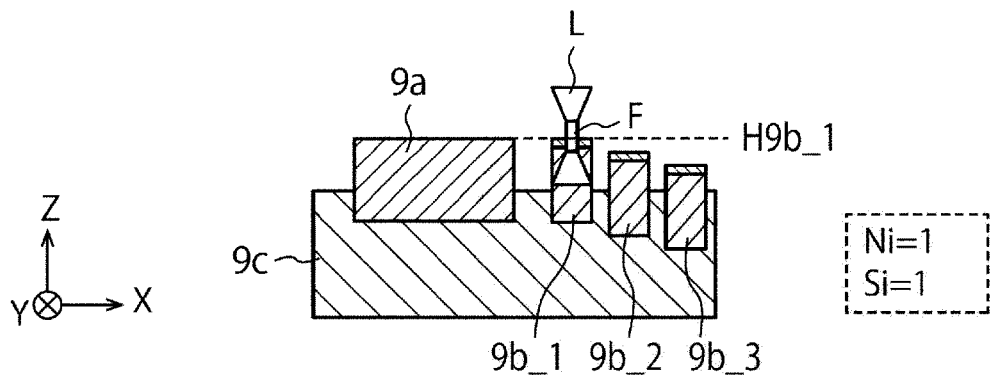
FIG. 7D is a conceptual diagram illustrating a method of adjusting the focus position of the laser beam using an adjustment sample.

Next, the relative position of the focus of the laser beam L with respect to the front surface position H9b_1 of the adjustment sample 9b_1 is further changed by changing the height of the stage 8 (position in the Z direction). At the position of the focus F illustrated in FIG. 7D, the controller 7 performs a control such that the front surface of the adjustment sample 9b_1 is irradiated with the laser beam L. At this time, the controller 7 performs a control such that a front surface region of the adjustment sample 9b_1, which is not yet irradiated with the laser beam L, is irradiated with the laser beam L by shifting the laser beam L from the irradiation positions of FIGS. 7A to 7C in an X direction or a Y direction. Thereby, the apparatus 1 performs again ablation of nickel and silicon of the adjustment sample 9b_1 under the same conditions as in FIGS. 7A to 7C while changing the relative position of the focus F. As illustrated in FIG. 7D, in a case where a center of the focus F substantially matches with the front surface position H9b_1 of the adjustment sample 9b_1, the signal intensity of silicon of the adjustment sample 9b_1 has a substantially maximum value. The signal intensity ratios of nickel and silicon are approximately 1 and approximately 1, respectively. That is, in this case, the ablation rate of nickel and the ablation rate of silicon both have substantially maximum values.

Figure 7E:
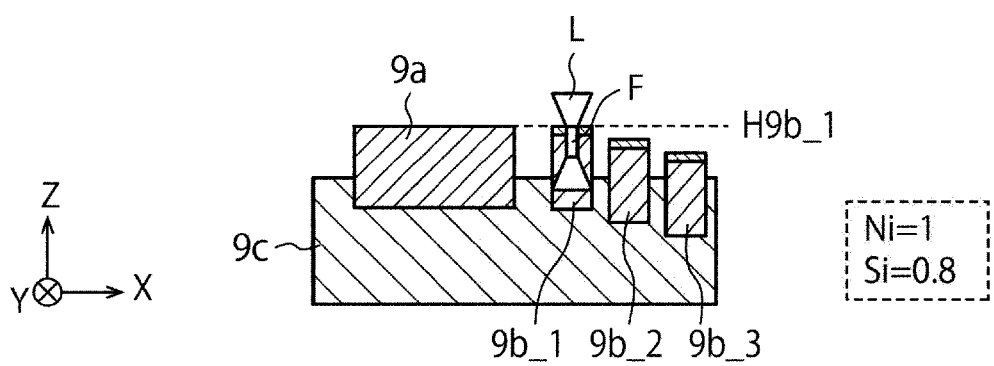
FIG. 7E is a conceptual diagram illustrating a method of adjusting the focus position of the laser beam using an adjustment sample.

Next, the relative position of the focus of the laser beam L with respect to the front surface position H9b_1 of the adjustment sample 9b_1 is further changed by changing the height of the stage 8 (position in the Z direction). At the position of the focus F illustrated in FIG. 7E, the controller 7 performs a control such that the front surface of the adjustment sample 9b_1 is irradiated with the laser beam L. At this time, the controller 7 performs a control such that a front surface region of the adjustment sample 9b_1, which is not yet irradiated with the laser beam L, is irradiated with the laser beam L by shifting the laser beam L from the irradiation positions of FIGS. 7A to 7D in an X direction or a Y direction. Thereby, the apparatus 1 performs again ablation of nickel and silicon of the adjustment sample 9b_1 under the same conditions as in FIGS. 7A to 7D while changing the relative position of the focus F. As illustrated in FIG. 7E, in a case where the front surface position H9b_1 of the adjustment sample 9b_1 is still within a range of the focus F but the center of the focus F is deviated from the front surface position H9b_1 of the adjustment sample 9b_1, the signal intensity of silicon of the adjustment sample 9b_1 decreases from the maximum value. The signal intensity ratios of nickel and silicon are approximately 1 and approximately 0.8, respectively.

Figure 7F:
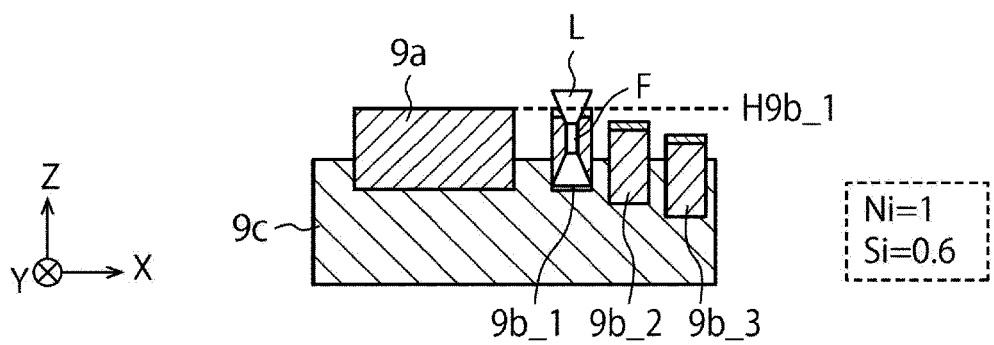
FIG. 7F is a conceptual diagram illustrating a method of adjusting the focus position of the laser beam using an adjustment sample.
Figure 8A:
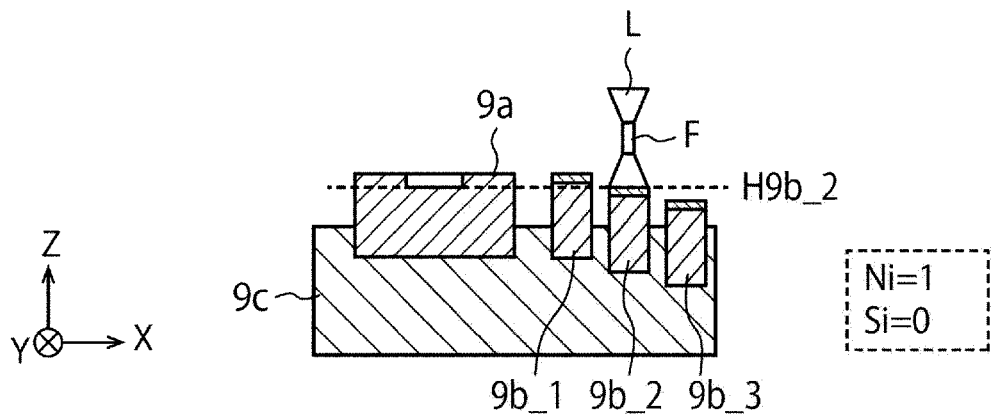
FIG. 8A is a conceptual diagram illustrating a method of adjusting the focus position of the laser beam using an adjustment sample.
Figure 8B:
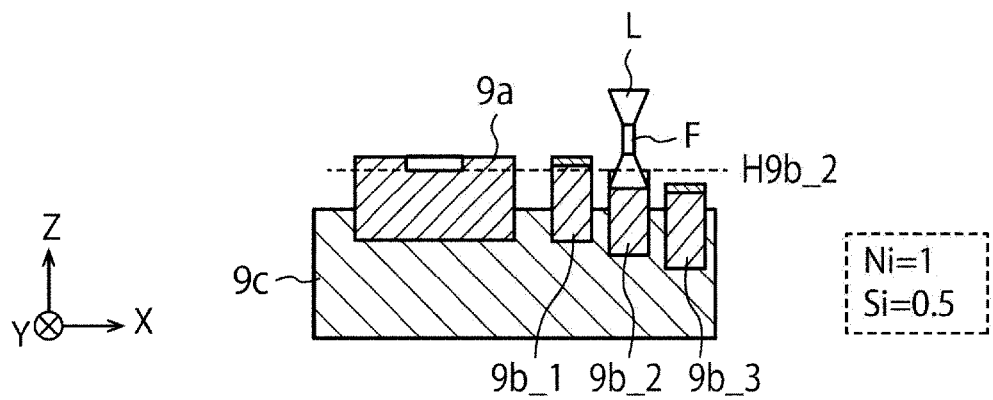
FIG. 8B is a conceptual diagram illustrating a method of adjusting the focus position of the laser beam using an adjustment sample.
Figure 8C:
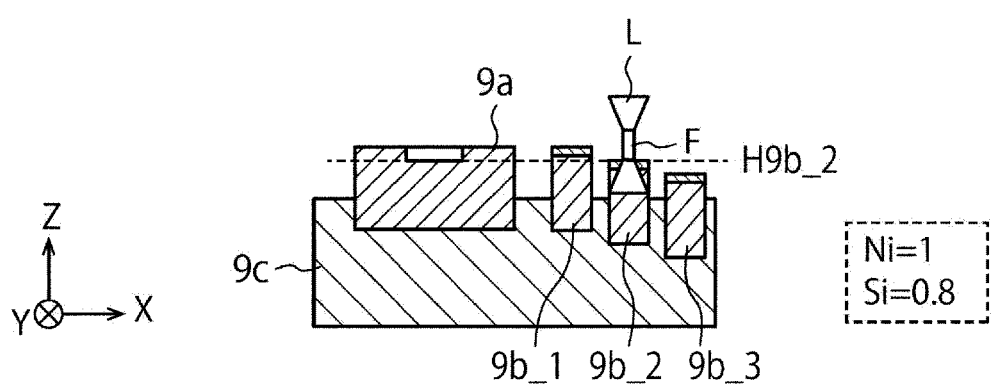
FIG. 8C is a conceptual diagram illustrating a method of adjusting the focus position of the laser beam using an adjustment sample.
Figure 8D:
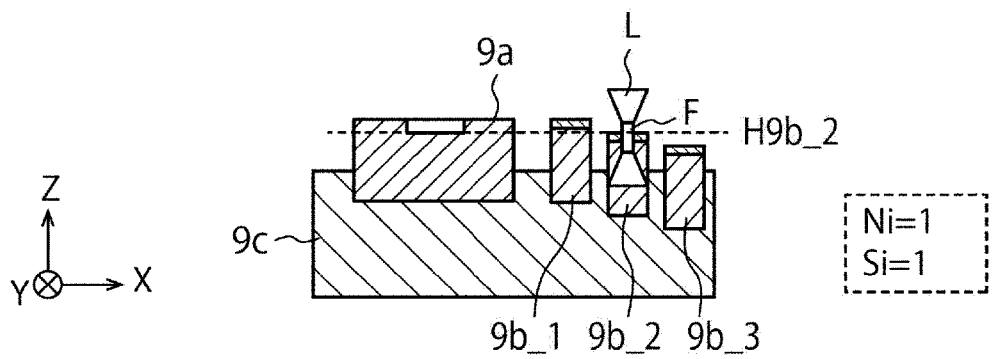
FIG. 8D is a conceptual diagram illustrating a method of adjusting the focus position of the laser beam using an adjustment sample.
Figure 8E:
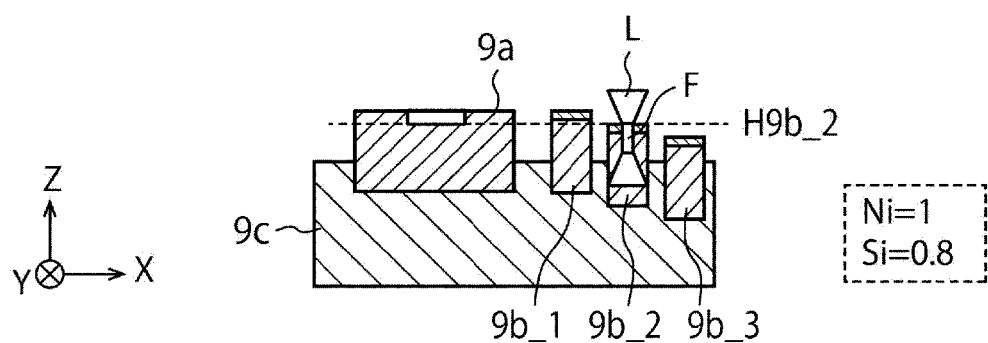
FIG. 8E is a conceptual diagram illustrating a method of adjusting the focus position of the laser beam using an adjustment sample.
Figure 8F:
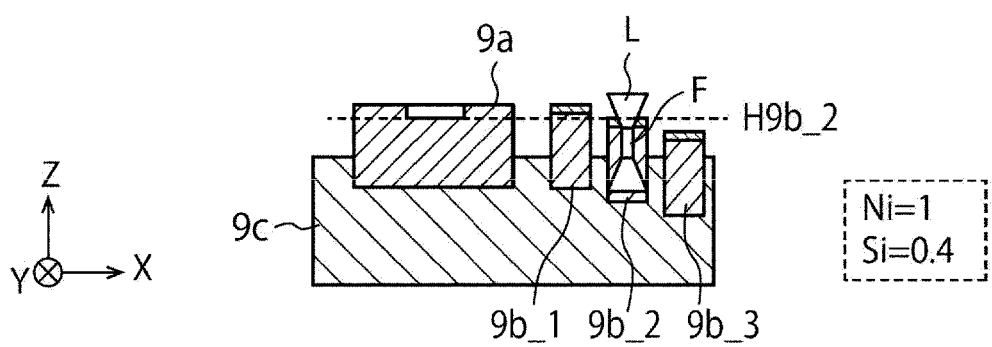
FIG. 8F is a conceptual diagram illustrating a method of adjusting the focus position of the laser beam using an adjustment sample.
Figure 9A:
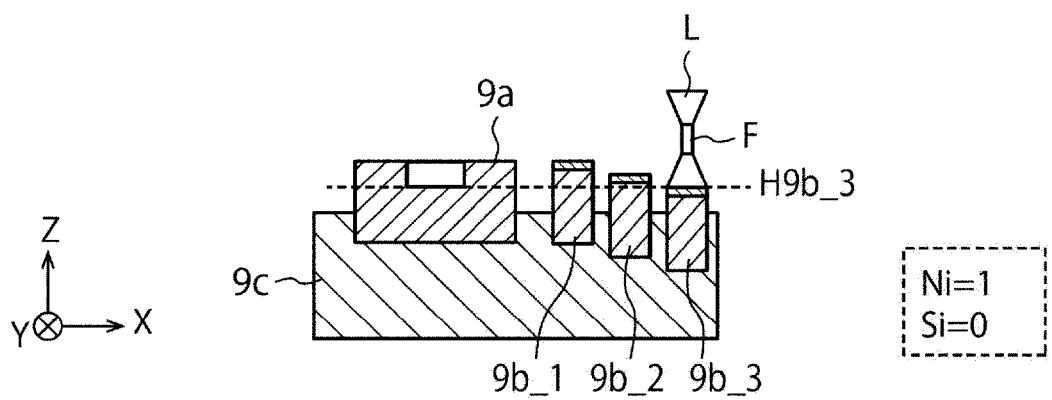
FIG. 9A is a conceptual diagram illustrating a method of adjusting the focus position of the laser beam using an adjustment sample.
Figure 9B:
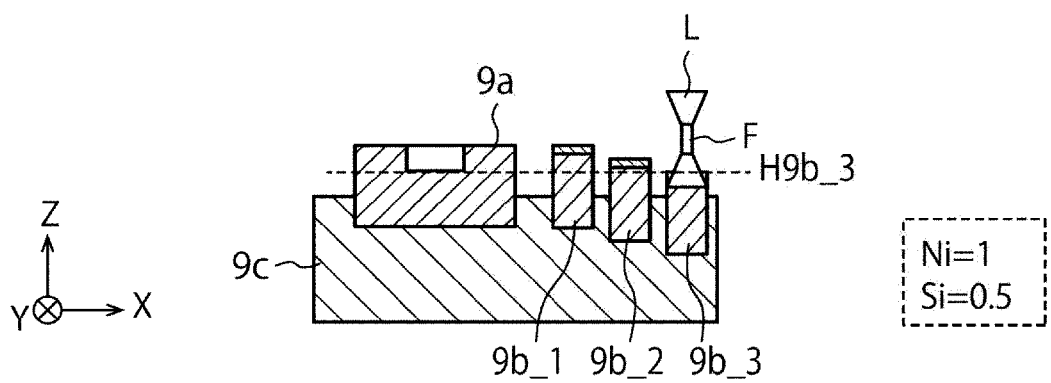
FIG. 9B is a conceptual diagram illustrating a method of adjusting the focus position of the laser beam using an adjustment sample.
Figure 9C:
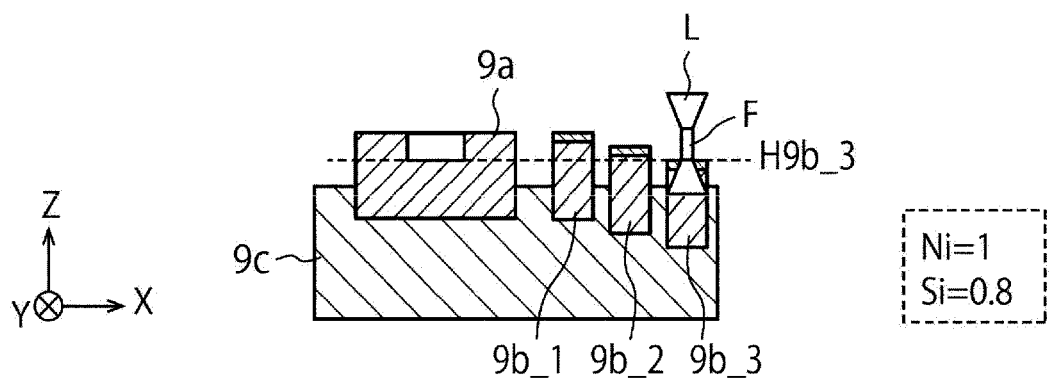
FIG. 9C is a conceptual diagram illustrating a method of adjusting the focus position of the laser beam using an adjustment sample.
Figure 9D:
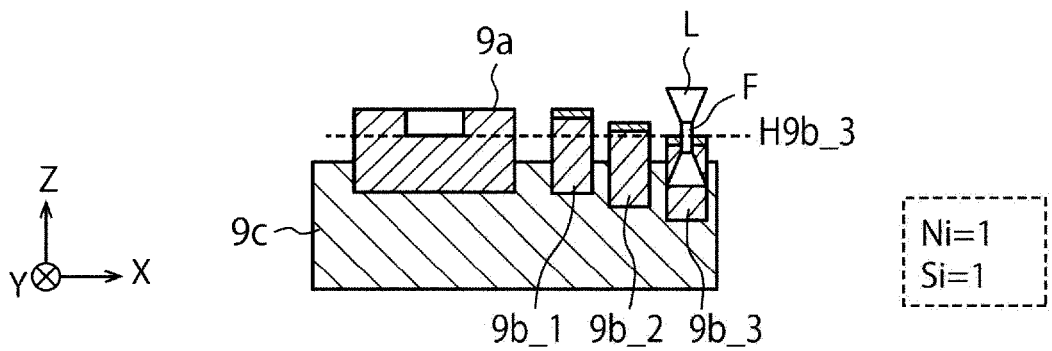
FIG. 9D is a conceptual diagram illustrating a method of adjusting the focus position of the laser beam using an adjustment sample.
Figure 9E:
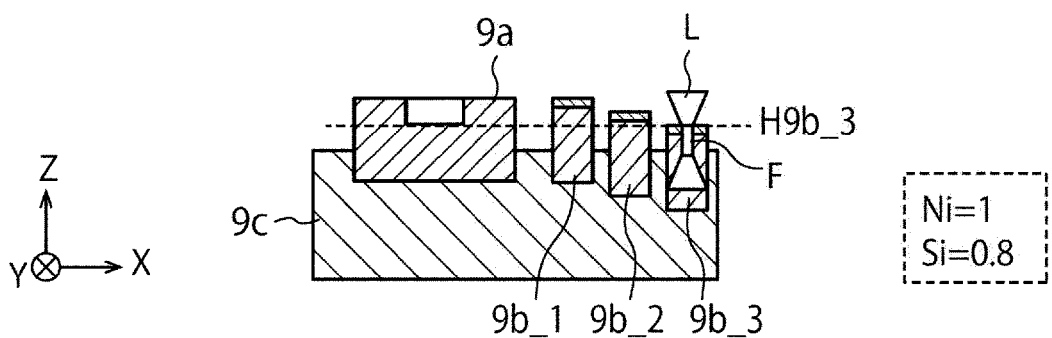
FIG. 9E is a conceptual diagram illustrating a method of adjusting the focus position of the laser beam using an adjustment sample.
Figure 9F:
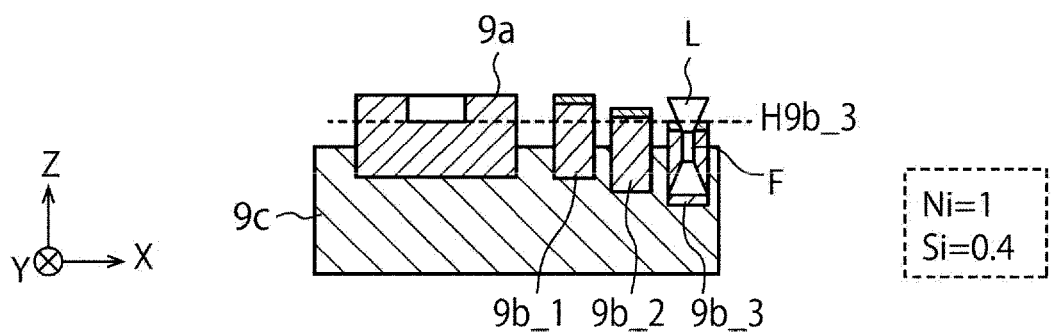
FIG. 9F is a conceptual diagram illustrating a method of adjusting the focus position of the laser beam using an adjustment sample.

Next, the relative position of the focus of the laser beam L with respect to the front surface position H9b_1 of the adjustment sample 9b_1 is further changed by changing the height of the stage 8 (position in the Z direction). At the position of the focus F illustrated in FIG. 7F, the controller 7 performs a control such that the front surface of the adjustment sample 9b_1 is irradiated with the laser beam L. At this time, the controller 7 performs a control such that a front surface region of the adjustment sample 9b_1, which is not yet irradiated with the laser beam L, is irradiated with the laser beam L by shifting the laser beam L from the irradiation positions of FIGS. 7A to 7E in an X direction or a Y direction. Thereby, the apparatus 1 performs again ablation of nickel and silicon of the adjustment sample 9b_1 under the same conditions as in FIGS. 7A to 7E while changing the relative position of the focus F. As illustrated in FIG. 7F, in a case where the focus F is greatly deviated from the front surface position H9b_1 of the adjustment sample 9b_1, the signal intensity of silicon of the adjustment sample 9b_1 further decreases. The signal intensity ratios of nickel and silicon are approximately 1 and approximately 0.6, respectively.

Here, it is assumed that a threshold value of the signal intensity ratio of silicon is 0.8. That is, it is assumed that the threshold value of the signal intensity of silicon is a value obtained by multiplying the maximum value of the signal intensity by 0.8. In this case, in a case where the signal intensity ratio of silicon is equal to or higher than 0.8, the calculation unit 25 determines that the front surface position H9b_1 of the adjustment sample 9b_1 is within the range of the focus F and the focus F corresponds (substantially matches) with the front surface position H9b_1 of the adjustment sample 9b_1. In other words, in a case where the signal intensity of silicon is equal to or higher than a value obtained by multiplying the maximum value of the signal intensity by 0.8, the calculation unit 25 determines that the front surface position H9b_1 of the adjustment sample 9b_1 is within the range of the focus F and the focus F corresponds (substantially matches) with the front surface position H9b_1 of the adjustment sample 9b_1. In a case where the front surface position H9b_1 of the adjustment sample 9b_1 is within the range of the focus F, in FIG. 5, the focus position Hf is within the range of the peak region P1. For example, in states of FIGS. 7C, 7D, and 7E, the calculation unit 25 determines that the focus F corresponds with the front surface position H9b_1 of the adjustment sample 9b_1, and in states of FIGS. 7A and 7F, the calculation unit 25 determines that the focus F does not correspond with the front surface position H9b_1 of the adjustment sample 9b_1. Thereby, the range of the focus position Hf in which the signal intensity Is is equal to or higher than the threshold value is determined.

Next, the controller 7 adjusts the height of the stage 8 in the Z direction such that the front surface of the analysis sample 9a is within the range of the focus position Hf (S30). That is, the controller 7 adjusts the height of the stage 8 in the Z direction such that the focus position Hf is within the peak region P1 of FIG. 5. At this time, in a case where the front surface of the analysis sample 9a is at a height position which is substantially the same as the front surface position H9b_1 of the adjustment sample 9b_1, the controller 7 may perform ablation of the analysis sample 9a at the same height by moving the laser generation unit 5 in parallel toward the analysis sample 9a in an X-Y plane without changing the height of the stage 8. In a case where the front surface of the analysis sample 9*a* is at a height position which is different from the front surface position H9*b*_1 of the adjustment sample 9*b*_1 by a predetermined value, the controller 7 performs a control such that the front surface position H9*b*_1 of the adjustment sample 9*b*_1 corresponds with the focus F by moving the laser generation unit 5 in parallel toward the analysis sample 9*a* in the X-Y plane and automatically changing the height of the stage 8 by a predetermined value. Thereafter, the apparatus 1 performs ablation of the analysis sample 9*a*. Thereby, the apparatus 1 can perform ablation of the analysis sample 9*a* in a state where the focus position Hf of the laser beam L automatically corresponds (substantially matches) with the front surface of the analysis sample 9*a*. The apparatus 1 performs ablation of the analysis sample 9*a*, and measures the signal intensity of the element contained in the analysis sample 9*a*. The ICP-MS unit 3 analyzes the analysis sample 9*a* based on the signal intensity of the element of the analysis sample 9*a*.

Next, the apparatus 1 repeats ablation of the analysis sample 9*a* and signal intensity measurement by a predetermined number of times (S40). As ablation is repeated, the front surface of the analysis sample 9*a* is scraped, and the height of the front surface of the analysis sample 9*a* is gradually lowered. At this time, as illustrated in FIG. 4, it is assumed that the ablation rate (for example, the thickness of the analysis sample 9*a* which is ablated by one-time irradiation with the laser beam L) is R1 corresponding to the signal intensity Is of the peak region P1. Since the ablation rate R1 corresponds to the signal intensity Is of the peak region P1, the ablation rate R1 is relatively stable. Therefore, although the focus position Hf is not changed, ablation can be performed in a state where the focus F of the laser beam L corresponds with the front surface of the analysis sample 9*a*. Further, the depth of the analysis sample 9*a* that is ablated depends on the number of times of ablation, and can be predicted.

On the other hand, in a case where the number of times of ablation is increased further than the predetermined number of times, the front surface position of the analysis sample 9*a* is deeper (further lowered in the Z direction), and the position of the focus F of the laser beam L is gradually deviated from the front surface of the analysis sample 9*a*. In this case, as described above, the ablation rate is likely to be changed, and is unstable.

For this reason, in at least one embodiment, after ablation is repeated by a predetermined number of times, whether or not the position of the focus F of the laser beam L corresponds with the front surface of the analysis sample 9*a* is determined by using the next adjustment sample 9*b*_2 (k=2) (YES in S50, and S60). More specifically, the adjustment sample 9*b*_2 is ablated with the laser beam L, and the signal intensity of silicon is measured, without changing the height of the stage 8 and the height of the focus F of the laser beam L. At this time, similar to step S20, the calculation unit 25 calculates the signal intensity ratio of silicon. The thickness (depth) of the analysis sample 9*a* that is ablated by performing ablation by a predetermined number of times can be predicted as described above. Therefore, the adjustment sample 9*b*_2 is disposed such that the front surface position H9*b*_2 of the adjustment sample 9*b*_2 substantially matches with the front surface position of the analysis sample 9*a* after ablation is performed by the predetermined number of times. That is, a difference in height between the front surface of the first adjustment sample 9*b*_1 (that is, the analysis sample 9*a*) and the front surface of the second adjustment sample 9*b*_2 is substantially equal to the thickness (difference between H9*b*_1 and H9*b*_2) of the analysis sample 9*a* that is vaporized in a case where the analysis sample 9*a* is irradiated with the laser beam L by a predetermined number of times.

As a result of ablation of the adjustment sample 9*b*_2, in a case where the signal intensity ratio of silicon is equal to or higher than the threshold value (for example, 0.8), that is, in a case where the signal intensity of silicon is equal to or higher than a value obtained by multiplying the maximum value of the signal intensity by 0.8, the calculation unit 25 determines that the focus F of the laser beam L still corresponds with the front surface position of the adjustment sample 9*b*_2, that is, the analysis sample 9*a* (YES in S50). In this case, the apparatus 1 continues to perform ablation of the analysis sample 9*a* and signal intensity measurement, without changing the height position of the focus F of the laser beam L with respect to the stage 8 (S40).

In a case where the signal intensity ratio of silicon is lower than the threshold value (for example, 0.8), that is, in a case where the signal intensity of silicon is lower than a value obtained by multiplying the maximum value of the signal intensity by 0.8, the calculation unit 25 determines that the focus F of the laser beam L does not correspond with the front surface position H9*b*_1 of the adjustment sample 9*b*_1, that is, the front surface position of the analysis sample 9*a* (YES in S50, and NO in S60). In this case, the apparatus 1 performs ablation and signal intensity measurement by using the adjustment sample 9*b*_2 (k=2) while changing the relative position between the focus F of the laser beam L and the front surface of the adjustment sample 9*b*_2 in the Z direction (S20).

FIGS. 8A to 8F are conceptual diagrams illustrating a method of adjusting the focus position F of the laser beam L using the adjustment sample 9*b*_2. A method of performing ablation and signal intensity measurement using the adjustment sample 9*b*_2 is the same as the method in step S20, except that the adjustment sample is different. Thus, a detailed description for ablation and signal intensity measurement using the adjustment sample 9*b*_2 will be omitted.

For example, it is assumed that a threshold value of the signal intensity ratio of silicon is 0.8. In this case, in a case where the signal intensity ratio of silicon is equal to or higher than 0.8, the calculation unit 25 determines that the front surface position H9*b*_2 of the adjustment sample 9*b*_2 is within the range of the focus F and the focus F corresponds with the front surface position H9*b*_2 of the adjustment sample 9*b*_2. In other words, in a case where the signal intensity of silicon is equal to or higher than a value obtained by multiplying the maximum value of the signal intensity by 0.8, the calculation unit 25 determines that the focus F corresponds with the front surface position H9*b*_2 of the adjustment sample 9*b*_2. For example, in states of FIGS. 8C, 8D, and 8E, the calculation unit 25 determines that the focus F corresponds with the front surface position H9*b*_2 of the adjustment sample 9*b*_2, and in states of FIGS. 8A and 8F, the calculation unit 25 determines that the focus F does not correspond with the front surface position H9*b*_2 of the adjustment sample 9*b*_2. Thereby, the range of the focus position Hf in which the signal intensity Is is equal to or higher than the threshold value is determined. It is noted that the threshold value is not limited to 0.8 and may be, for example, 0.7 or 0.9. Further, for example, in a case where the signal intensity ratio of silicon exceeds the threshold value and then becomes lower than the threshold value again, the calculation unit 25 may determine that the focus F corresponds with the front surface position H9*b*_2 of the adjustment sample 9*b*_2.

Next, the controller 7 performs processing of steps S30 to S50 again. At this time, in step S30, the height of the stage 8 is adjusted such that the front surface of the analysis sample 9a is within the range of the focus position Hf, and in step S40, ablation is repeated by a predetermined number of times. Thereafter, in step S50, whether or not the position of the focus F of the laser beam L corresponds with the front surface position of the analysis sample 9a is determined by using the adjustment sample 9b_3 (k=3) (S60). In a case where, in step S60, it is determined that the position of the focus F of the laser beam L corresponds with the front surface position of the analysis sample 9a (YES in S50, and YES in S60), the apparatus 1 continues to perform ablation of the analysis sample 9a and signal intensity measurement, without changing the height position of the focus F of the laser beam L with respect to the stage 8.

In a case where, in step S60, it is determined that the position of the focus F of the laser beam L does not correspond with the front surface position of the analysis sample 9a (YES in S50, and NO in S60), the apparatus 1 performs ablation and signal intensity measurement by using the adjustment sample 9b_3 (k=3) while changing the relative position between the focus F of the laser beam L and the front surface of the adjustment sample 9b_3 in the Z direction (S20).

FIGS. 9A to 9F are conceptual diagrams illustrating a method of adjusting the focus position Hf of the laser beam L using the adjustment sample 9b_3. A method of performing ablation and signal intensity measurement using the adjustment sample 9b_3 is the same as the method in step S20, except that the adjustment sample is different. Thus, a detailed description for ablation and signal intensity measurement using the adjustment sample 9b_3 will be omitted.

For example, it is assumed that a threshold value of the signal intensity ratio of silicon is 0.8. In this case, in a case where the signal intensity ratio of silicon is equal to or higher than 0.8, the calculation unit 25 determines that the front surface position H9b_3 of the adjustment sample 9b_3 is within the range of the focus F and the focus F corresponds (substantially matches) with the front surface position H9b_3 of the adjustment sample 9b_3. In other words, in a case where the signal intensity of silicon is equal to or higher than a value obtained by multiplying the maximum value of the signal intensity by 0.8, the calculation unit 25 determines that the focus F corresponds with the front surface position H9b_3 of the adjustment sample 9b_3. In this case, for example, in states of FIGS. 9C, 9D, and 9E, the calculation unit 25 determines that the focus F corresponds with the front surface position H9b_3 of the adjustment sample 9b_3, and in states of FIGS. 9A and 9F, the calculation unit 25 determines that the focus F does not correspond with the front surface position H9b_3 of the adjustment sample 9b_3. Thereby, the range of the focus position Hf in which the signal intensity Is is equal to or higher than the threshold value is determined.

Next, the controller 7 performs processing of steps S30 to S50 again. At this time, in step S30, the height of the stage 8 is adjusted such that the front surface of the analysis sample 9a is within the range of the focus position Hf, and in step S40, ablation is repeated by a predetermined number of times.

In at least one embodiment, since there is no adjustment sample after the adjustment sample 9b_3, a determination result in step S50 is NO, and the process is ended.

The number of the adjustment samples provided on the sample unit 9 may be any number. After adjusting the position of the focus F using the adjustment sample 9b_k, the apparatus 1 increments k every time ablation of the analysis sample 9a is performed by a predetermined number of times, and determines whether or not the focus F corresponds with the front surface position of the analysis sample 9a by using the adjustment sample 9b_k.

In a case where the adjustment sample 9b_k does not exist (NO in S50), ablation and signal intensity measurement are ended.

Generally speaking, a k-th (k is an integer of two or more) adjustment sample that has an upper surface of which a height is lower than a height of a (k−1)th adjustment sample is provided on the sample unit 9. The focus position Hf of the laser beam L is adjusted using the (k−1)-th adjustment sample, and then the analysis sample 9a is irradiated with the laser beam L by a predetermined number of times. Thereafter, the controller 7 determines whether or not the focus position of the laser beam L corresponds with the front surface position of the analysis sample 9a based on whether or not the ratio of the signal intensity of the k-th adjustment sample to the maximum value of the signal intensity is equal to or higher than a threshold value (for example, 0.8) or whether or not the signal intensity of the k-th adjustment sample is equal to or higher than a threshold value (for example, a value obtained by multiplying the maximum value of the signal intensity by 0.8).

The difference in the front surface height between the (k−1)th adjustment sample 9b_(k−1) and the k-th adjustment sample 9b_k is set to be substantially equal to the thickness of the analysis sample 9a (difference between H9b_(k−1) and H9b_k) that is vaporized in a case where the analysis sample 9a is irradiated with the laser beam L by a predetermined number of times after the focus position of the laser beam L is adjusted so as to correspond with the front surface of the (k−1)th adjustment sample 9b_(k−1).

In a case where the ratio of the signal intensity of the k-th adjustment sample to the maximum value of the signal intensity is equal to or higher than a threshold value or in a case where the signal intensity of the k-th adjustment sample is equal to or higher than a threshold value, the controller 7 determines that the front surface position of the analysis sample 9a and the focus position of the laser beam L correspond with each other, and continues to perform ablation of the analysis sample 9a. On the other hand, in a case where the ratio is lower than the threshold value or in a case where the signal intensity of the k-th adjustment sample is lower than the threshold value, the controller 7 determines that the front surface position of the analysis sample 9a and the focus position of the laser beam L do not correspond with each other. In this case, step S20 and subsequent steps are performed again using the k-th adjustment sample. Thereby, in a state where the front surface position of the analysis sample 9a and the focus position of the laser beam L are readjusted and the front surface position of the analysis sample 9a and the focus position of the laser beam L correspond with each other, ablation of the analysis sample 9a can be performed.

As described above, not only the analysis sample 9a but also the adjustment samples 9b_1 to 9b_3 are provided on the stage 8, and the ICP-MS apparatus 1 according to at least one embodiment determines the focus position Hf of the laser beam L based on the signal intensity of the adjustment sample 9b_1. The front surface position of the adjustment sample 9b_1 in the Z direction is equal to the front surface position of the analysis sample 9a, or is different from the front surface position of the analysis sample 9a by a predetermined difference. Therefore, the ICP-MS apparatus 1 can accurately and automatically adjust the focus position of the laser beam L such that the focus position of the laser beam L corresponds with the front surface of the analysis sample 9a, and perform ablation of the analysis sample 9a and signal intensity measurement. That is, the apparatus 1 can perform ablation of the analysis sample 9a using the maximum value of the signal intensity (peak region P1). Thereby, a variation in the focus position Hf of the laser beam L with respect to the front surface of the analysis sample 9a can be suppressed.

Further, according to at least one embodiment, every time the analysis sample 9a is irradiated with the laser beam L by a predetermined number of times, the controller 7 determines whether or not the front surface position of the analysis sample 9a and the focus position Hf of the laser beam L correspond with each other by using the adjustment sample 9b_2 or the like. In a case where the front surface position of the analysis sample 9a and the focus position Hf of the laser beam L do not correspond with each other, the controller 7 determines again the focus position Hf of the laser beam L using the signal intensity of the adjustment sample 9b_2, and performs a control such that the focus position Hf corresponds with the front surface of the analysis sample 9a. Thereby, even in a case where the front surface position of the analysis sample 9a is lowered in the Z direction due to ablation, the focus position of the laser beam L can be periodically adjusted so as to correspond with the front surface of the analysis sample 9a. Therefore, even in a case where the front surface position of the analysis sample 9a is changed in the Z direction, the ablation rate of the analysis sample 9a can be stabilized.

Next, a relationship between the condition of the apparatus 1 and the focus position Hf of the laser beam L will be described.

Figure 10A:
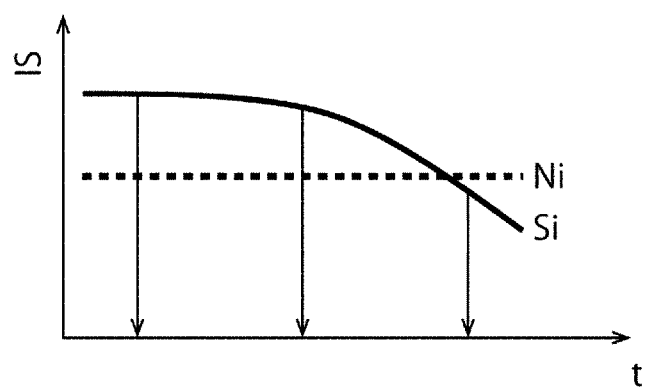
FIG. 10A is a graph illustrating signal intensities of a main body and a metal thin film of an adjustment sample.
Figure 10B:
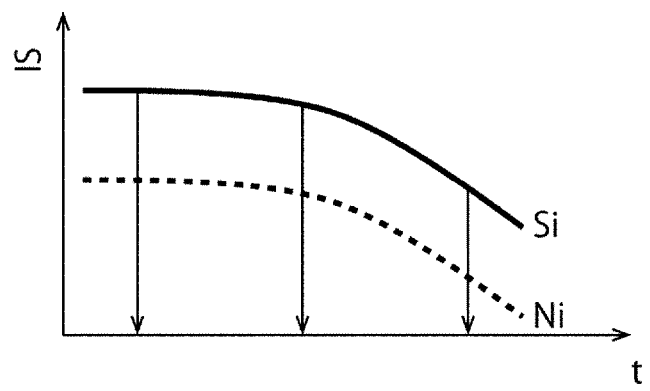
FIG. 10B is a graph illustrating signal intensities of a main body and a metal thin film of an adjustment sample.

FIGS. 10A and 10B are graphs illustrating the signal intensities of the main body 91 and the metal thin film 92 of the adjustment sample 9b_k. A vertical axis represents the signal intensity, and a horizontal axis represents the number of times of ablation t after adjustment of the focus position Hf of the laser beam L. The number of times of ablation t may be an ablation time or the number of times of determinations of the focus position Hf of the laser beam L.

In FIG. 10A, the signal intensity Is of silicon as the main body 91 decreases with the number of times of ablation. On the other hand, the signal intensity Is of nickel as the metal thin film 92 does not change with the number of times of ablation.

This means that the main body 91 is scraped by ablation and the focus position Hf of the laser beam L is gradually deviated from the front surface position of the main body 91. That is, the focus position Hf of the laser beam L is deviated from the front surface position of the main body 91, and the signal intensity (ablation rate) of the main body 91 is lowered. On the other hand, as described above, the metal thin film (for example, nickel) 92 is very thin, and is likely to be ablated. Thus, even in a case where the focus position Hf of the laser beam L is deviated from the front surface position of the metal thin film 92 to some extent, the metal thin film is immediately ablated, and substantially the same signal intensity (ablation rate) can be obtained.

In this way, in a case where the signal intensity of the main body 91 is changed and the signal intensity of the metal thin film 92 is not changed, it can be determined that the focus position Hf of the laser beam L is gradually deviated from the front surface position of the main body 91.

On the other hand, in FIG. 10B, both of the signal intensity Is of silicon as the main body 91 and the signal intensity Is of nickel as the metal thin film 92 decrease with the number of times of ablation. This indicates that not only the focus position Hf of the laser beam L is deviated from the front surface position of the main body 91, but also the condition of the apparatus 1 other than the focus position Hf of the laser beam L is changed. For example, a change in flow rate of the carrier gas in the sample chamber 4, a change in plasma temperature of the ICP-MS unit 3, dirt on a lens system, deterioration of a detector, or the like may be considered. In this way, it is possible to distinguish a deviation of the focus position Hf of the laser beam L and a change in the condition of the apparatus 1 other than the focus position Hf.

Of course, in a case where the focus position Hf of the laser beam L is deviated so much that nickel cannot be ablated, the ablation rate of nickel cannot be maintained and is decreased. On the other hand, it is considered to be rare that, after adjustment of the focus position Hf of the laser beam L, the analysis sample 9a is scraped by ablation of the analysis sample 9a and the focus position Hf is deviated so much that nickel cannot be ablated.

As described above, the adjustment sample 9b_k includes the metal thin film 92 on the front surface of the main body 91, and thus it is possible to determine whether or not the ICP-MS apparatus 1 is normally operated.

At least a part of the analysis method according to the present embodiment may be realized by hardware, or may be realized by software. In a case where a part of the analysis method is realized by software, a program for realizing at least some of functions of the analysis method may be stored in a recording medium such as a flexible disk or a CD-ROM, and the program may be read and executed by a computer. The recording medium is not limited to a removable medium such as a magnetic disk or an optical disk, and may be a fixed recording medium such as a hard disk device or a memory. In addition, a program for realizing at least some of functions of the analysis method may be distributed via a communication line (including wireless communication) such as the Internet. Further, the program may be distributed via a wired line such as the Internet or via wireless communication by being encrypted, modulated, or compressed, or by being stored in a recording medium.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An analysis apparatus comprising:
a stage arranged to support an analysis sample as an analysis target and to support a first adjustment sample used for adjusting a focus;
a laser generator configured to generate a laser beam for vaporizing the analysis sample or the first adjustment sample by irradiating the sample with the laser beam;
a detector configured to detect a signal intensity of an element of the analysis sample or the first adjustment sample vaporized by the irradiation with the laser beam; and
a controller configured to determine a focus position of the laser beam, with respect to a front surface position of the first adjustment sample, based on the signal intensity of the first adjustment sample, and to control the focus position of the laser beam to correspond with a front surface of the analysis sample.

2. The analysis apparatus according to claim 1, wherein, the controller is configured to, when a first ratio of the signal intensity of the first adjustment sample to a maximum value of the signal intensity is equal to or higher than a threshold value, or when the signal intensity of the first adjustment sample is equal to or higher than a threshold value, determine that the focus position of the laser beam corresponds with the front surface position of the first adjustment sample.

3. The analysis apparatus according to claim 2, wherein a second adjustment sample is provided on the stage, second adjustment sample used for adjusting the focus and having an upper surface whose height is lower than a height of the first adjustment sample, and the controller is configured to, after the analysis sample is irradiated with the laser beam a predetermined number of times, determine whether the focus position of the laser beam corresponds to a front surface position of the analysis sample, the determination being based on whether: (a) a second ratio of a signal intensity of the second adjustment sample to the maximum value of the signal intensity is equal to or higher than a threshold value, or (b) the signal intensity of the second adjustment sample is equal to or higher than a threshold value.

4. The analysis apparatus according to claim 3, wherein the controller is configured to, when the second ratio is equal to or higher than the threshold value, or when the signal intensity of the second adjustment sample is equal to or higher than the threshold value, determine that the focus position of the laser beam corresponds with the front surface position of the analysis sample, and the controller is configured to, when the second ratio is lower than the threshold value or when the signal intensity of the second adjustment sample is lower than the threshold value, determine that the focus position of the laser beam does not correspond with the front surface position of the analysis sample.

5. The analysis apparatus according to claim 2, wherein a k-th (k is an integer of three or more) adjustment sample used for adjusting the focus and the k-th adjustment sample having an upper surface of which a height is lower than a height of a (k−1)th adjustment sample is provided on the stage, and after the analysis sample is irradiated with the laser beam a predetermined number of times, the controller is configured to determine whether the focus position of the laser beam corresponds with a front surface position of the analysis sample based on whether: (a) a k-th ratio of the signal intensity of the k-th adjustment sample to the maximum value of the signal intensity is equal to or higher than a threshold value, or (b) the signal intensity of the k-th adjustment sample is equal to or higher than a threshold value.

6. The analysis apparatus according to claim 5, wherein the controller is configured to, when the k-th ratio is equal to or higher than the threshold value or when the signal intensity of the k-th adjustment sample is equal to or higher than the threshold value, determine that the focus position of the laser beam corresponds with the front surface position of the analysis sample, and the controller is configured to, when the k-th ratio is lower than the threshold value or when the signal intensity of the k-th adjustment sample is lower than the threshold value, determine that the focus position of the laser beam does not correspond with the front surface position of the analysis sample.

7. The analysis apparatus according to claim 1, wherein the controller is configured as a personal computer.

8. The analysis apparatus according to claim 1, wherein the detector includes a mass analysis detector.

9. The analysis apparatus according to claim 1, wherein the laser generator is configured to laser ablate the analysis sample or the first adjustment sample.

10. The analysis apparatus according to claim 9, wherein the laser beam is directed in a depth direction of the analysis sample or the first adjustment sample.

11. The analysis apparatus according to claim 1, wherein the first adjustment sample includes two layers of different materials.

12. The analysis apparatus according to claim 11, wherein one of the two layers includes silicon, and an other of the two layers includes nickel.

13. The analysis apparatus according to claim 1, wherein the first adjustment sample is one of a plurality of adjustment samples, which are of substantially a same size and a same material.

14. The analysis apparatus according to claim 1, wherein the analysis sample and the first adjustment sample are made of substantially a same material.

15. An analysis method using an analysis apparatus that includes a stage arranged to support a sample, a laser generator configured to irradiate the sample with a laser beam, a detector configured to detect signal intensity of an element of the sample vaporized by the irradiation with the laser beam, and a controller configured to control the laser generator, the method comprising:

providing an analysis sample as an analysis target, and a first adjustment sample used for adjusting a focus on the stage;

irradiating the first adjustment sample with the laser beam;

detecting signal intensity of an element of the first adjustment sample vaporized by irradiation with the laser beam;

determining a focus position of the laser beam with respect to a front surface position of the first adjustment sample based on the signal intensity of the first adjustment sample;

controlling the laser generator such that the focus position of the laser beam corresponds with a front surface of the analysis sample;

detecting signal intensity of an element of the analysis sample by irradiating the analysis sample with the laser beam; and analyzing the analysis sample based on the signal intensity of the element of the analysis sample.

* * * * *